(12) United States Patent
Kanbayashi

(10) Patent No.: US 6,594,039 B1
(45) Date of Patent: Jul. 15, 2003

(54) IMAGE READING DEVICE, AN IMAGE READING METHOD, A COMPUTER PROGRAM PRODUCT FOR STORING AN IMAGE READING SEQUENCE, AND AN IMAGE FORMING APPARATUS

(75) Inventor: Hideyuki Kanbayashi, Sagamihara (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/558,746

(22) Filed: Apr. 21, 2000

(30) Foreign Application Priority Data

Apr. 22, 1999 (JP) ............................. 11-114782

(51) Int. Cl.[7] .............. H04N 1/04; H04N 1/32; H04N 1/40; H04N 1/46
(52) U.S. Cl. .............. 358/491; 358/496; 358/497; 358/468; 358/486; 358/443; 358/498; 358/505; 358/530
(58) Field of Search ................ 358/496, 497, 358/468, 486, 443, 530, 498, 505

(56) References Cited

U.S. PATENT DOCUMENTS

| | | | | |
|---|---|---|---|---|
| 5,032,904 A | * | 7/1991 | Murai et al. ............... | 358/500 |
| 5,745,253 A | * | 4/1998 | Muramatsu et al. ........ | 358/408 |
| 5,852,501 A | * | 12/1998 | Maehara et al. ............ | 358/505 |
| 5,999,645 A | * | 12/1999 | Ito ............................. | 382/164 |
| 6,055,070 A | * | 4/2000 | Kang ......................... | 358/497 |

FOREIGN PATENT DOCUMENTS

| JP | 07-273952 A | 10/1995 |
|---|---|---|
| JP | 09-261417 A | 10/1997 |

* cited by examiner

Primary Examiner—Edward Coles
Assistant Examiner—Houshang Safaipour
(74) Attorney, Agent, or Firm—Sidley Austin Brown & Wood LLP

(57) ABSTRACT

The present invention provides an image reading device and image reading method which reduce the total reading time and do not produce color drift when reading a plurality of documents comprising a mix of color and monochrome documents. The present invention provides for reading all documents by moving the documents during reading past a fixed position reader. If the documents are determined to be color documents, the documents are read by moving the reader during reading past fixed position documents. The present invention also provides an image forming apparatus, which reduces the total reading time when reading a mix of color and monochrome documents. The present invention additionally provides a computer program product for use in an image reading system to operate the system in the prescribed manner.

15 Claims, 4 Drawing Sheets

IMAGE READING DEVICE, AN IMAGE READING METHOD, A COMPUTER PROGRAM PRODUCT FOR STORING AN IMAGE READING SEQUENCE, AND AN IMAGE FORMING APPARATUS

CROSS-REFERENCE TO RELATED APPLICATIONS

The present application is related to application number JP(A) 11-114782, filed in Japan, the entire contents of which are hereby incorporated by reference.

FIELD OF THE INVENTION

The present invention relates to an image reading device capable of selecting a first reading method for reading a document by moving the document while the reading means is stationary, a second reading method for reading a document by moving the reading means while the document is stationary, an image reading method, a computer program product for storing an image reading sequence, and an image forming apparatus.

BACKGROUND OF THE INVENTION

Conventionally, the reading methods used in image reading devices include a sheet-through scanning method for reading a document while the document moves relative to a stationary reading unit, and a flatbed scanning method for reading a document while the reading unit moves relative to the stationary document.

The sheet-through scanning method is suitable for high-speed reading because the documents are sequentially fed at high-speed to a reading unit, but are unsuitable for reading color documents due to the difficulty of achieving high-precision document transport control due to differences in thickness and friction coefficient corresponding to the type of document. The flatbed scanning method is appropriate for reading color documents due to the ease of achieving high-precision control of the movement of the reading unit, but is inappropriate for high-speed reading because the reading unit must be moved and has considerable weight.

Conventional art utilizing the mutual advantages of the two methods include, for example, Japanese-Laid-Open Patent Application No. HEI 9-261417, which discloses a reading device which performs a preliminary scan of a plurality of documents via a sheet-through method, and after determining whether each document is a color document or a monochrome document, scans the color documents via the flatbed scan method, and scans the monochrome documents via the sheet-through method. Japanese Laid-Open Patent Application No. HEI 7-273952 discloses a reading device which determines whether or not a document is a color document before reading the document, and reduces the document transport speed for color documents so as to improve the reading accuracy of color documents by the sheet-through scan method.

In the art of the former disclosure, however, a disadvantage arises in that extra time is required to conduct a preliminary scan of all the documents to determine whether the document is a color document or a monochrome document. Moreover, in the art of the latter disclosure, it is difficult to read a document via the sheet-through method at greater accuracy than the flatbed scan method even when the document transport speed is reduced due to differences in friction coefficient and document type, thereby leading to the possibility of color shift in the case of color documents.

SUMMARY OF THE INVENTION

A first object of the present invention is to provide an image reading device and an image reading method for utilizing the respective advantages of the sheet-through and flatbed scan methods which reduce the entire reading time when reading a mixture of color and monochrome documents. A second object of the present invention is to provide an image reading device and an image reading method which do not produce color-shifts in color documents. A third object of the present invention is to provide a computer program product for storing image reading instructions. Another object of the present invention is to provide an image forming apparatus that utilizes this image reading device.

These objects of the present invention are attained by the means described below.

In a first aspect of the present invention, an image reading device includes a reader for reading a document thereby obtaining image data. The position of the reader can be moved relative to the document being read. The image reading device further includes a controller that operates the reader in one of two modes. The first reading mode moves the document relative to the reader while the reader is stationary. The second mode moves the reader relative to the document while the document is stationary. After the document is read in the first mode, a decision unit determines whether the obtained image data correspond to color image data or monochrome image data. An output controller then outputs the image data if the image data is monochrome image data. If the image data is color image data, the document is read by the second mode, and the second mode image data is output.

In a second aspect of the present invention, an image reading method is disclosed. This method includes reading a document by moving a document relative to a stationary reader to obtain image data. The resultant image data is then determined to represent either monochrome image data or color image data. If the image data represent monochrome image data, the image data is outputted. However, if the image data represent color image data, the document is read a second time by moving the reader relative to a stationary document to obtain image data. The image data from the second reading is then output.

In a third aspect of the present invention, a computer program product is disclosed. This product includes instructions for recording image data. The instructions include first instructions to read a document that moves relative to a reader that is stationary in order to obtain image data. The second instructions are to determine whether the image data obtained by the first instruction represent a color image or a monochrome image. If the second instructions determine the image data represent monochrome data, the third instructions are executed which output the image data from the first instructions, and no more instructions are executed. If the second instructions determine the image data represent color image data, the fourth instructions are executed. The fourth instructions are to read the document that is stationary by a reader that moves relative to the document in order to obtain image data. The fifth instructions are to output the image data from the fourth instructions.

DETAILED DESCRIPTION OF THE PREFERRED EMBODIMENTS

The embodiments of the present invention are described hereinafter with reference to the accompanying drawings.

Figure 1:
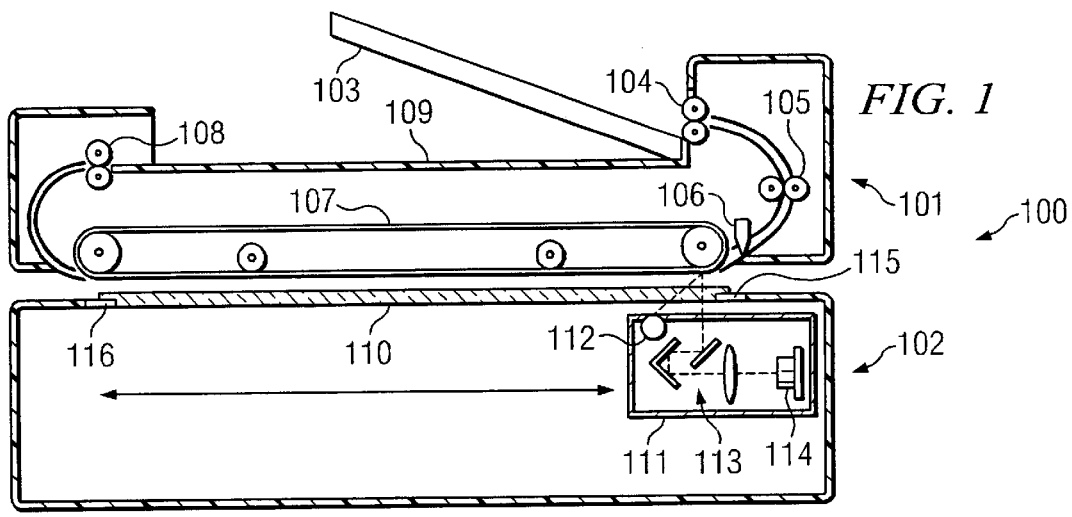
FIG. 1 shows the mechanical construction of the reading device of the present invention.
Figure 2:
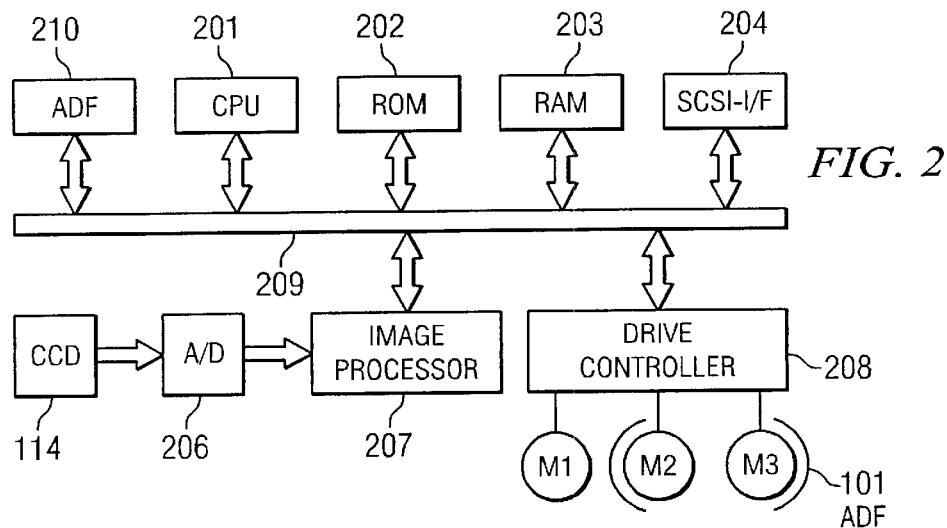
FIG. 2 is a block diagram showing the structure of the controller of the reading device.

FIG. 1 shows the mechanical construction of a reading device of the present invention, and FIG. 2 is a block diagram showing the structure of the control unit of the reading device.

The reading device 100 mainly comprises an Automatic Document Feeder (ADF) 101 for feeding documents one sheet at a time, and a scanner 102 for reading the document image.

The ADF 101 is provided with a document tray 103 for holding a plurality of document sheets, pick-up roller 104 for extracting the document set in the document tray 103 sheet by sheet, feed roller 105 for transporting a fed sheet at constant speed to a transport belt 107, transport belt 107 for transporting a document at constant speed, discharge roller 108 for ejecting a sheet transported by the transport belt 107, and a discharge tray 109 for accommodating ejected documents. The ADF 101 is further provided with a sensor (not illustrated) for detecting the presence/absence of a document on the document tray 103, and a standard position sensor 106 disposed anterior to the transport belt 107 for detecting a document being transported.

The scanner 102 is provided with a platen 110 disposed at a position opposite the transport belt 107, and a reading unit 111 capable of reciprocating reading below the platen 110. The reading unit 111 is provided with an illumination lamp 112 for illuminating a document surface, mirror-lens optical system 113, and CCD photoreceptor unit 114 comprising a charge-coupled device line image sensor for reading the image of each color red (R), green (G), and blue (B), wherein the light reflected from a document surface illuminated by the illumination lamp 112 is directed to the CCD photoreceptor unit 114 by the mirror-lens optical system 113.

The reading-device 100 is capable of consecutively reading via a sheet-through scan method (first reading method), and reading via a flatbed scan method (second reading method).

When the sheet-through scan method is used, the reading unit 111 is stopped at a home position 115, and reading starts at the moment when the leading edge of a transported document is detected at the standard position by the standard position sensor 106, and reading ends at the moment when the trailing edge of the document is detected by the standard position sensor 106.

When the flatbed scan method is used, after a document is transported to a predetermined position on the platen 110 via the ADF 101, the reading unit 111 is moved relative to the document and reads the document. After the reading unit 111 has moved to an end position 116, it is returned to the home position 115.

The control unit of the reading device, as shown in FIG. 2, comprises a CPU 201 for controlling each part of the reading device by executing specific programs, a ROM 202 for storing the programs required for control, a RAM 203 having a work area for the CPU 201 and a storage area for image data, a Small Computer Systems Interface (SCSI-I/F) 204 for transferring data to an external computer or the like, an A/D converter 206 for converting analog image data output from the CCD photoreceptor unit 114 to digital image data, an image processor 207 for processing of the image data and determining whether a document is a color document or a monochrome document, a drive controller 208 for controlling the various drive units, and an ADF signal input interface 210 for receiving signal input from the various sensors provided in the ADF 101. The various parts are mutually connected via a bus line 209 to transfer signals.

Figure 3:
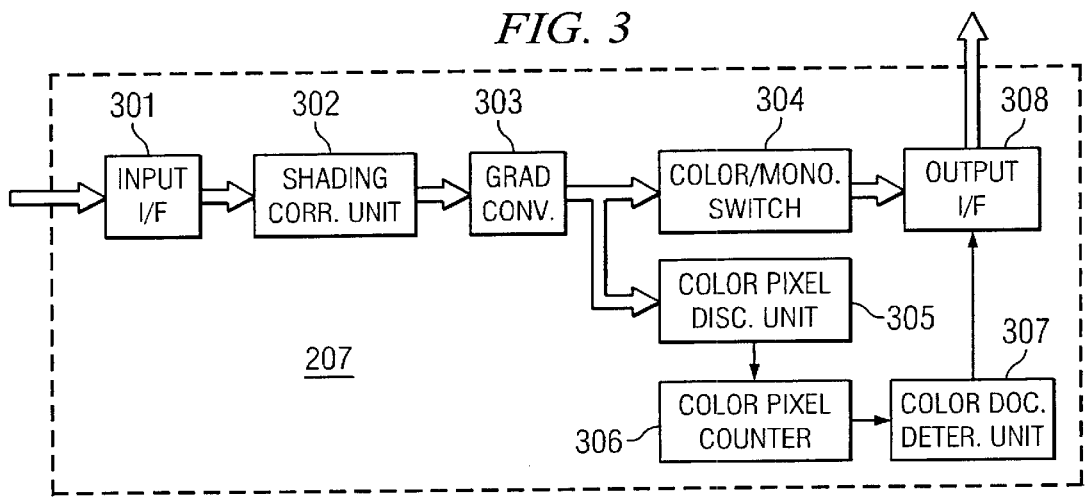
FIG. 3 is a block diagram showing the structure of the image processor provided within the controller.

As shown in FIG. 3, the image processor 207 comprises an input interface 301, shading correction unit 302, gradient converter 303, color/monochrome switch 304, color pixel discriminator unit 305, color pixel counter 306, color document determining unit 307, and output interface 308.

In the image processor 207, the input interface 301 receives the image data of each color R, G, and B after digital conversion, the shading correction unit 302 corrects characteristic dispersion of each pixel of the CCD line sensor and illumination irregularities, and the gradient converter 303 performs gradient conversion when the read gradients differ from the output gradients (e.g., R, G, and B color image data input when the read gradient is 12-bits and the output gradient is 8-bits, are output as 8-bit data). After gradient conversion, the R, G, and B color image data are input to the color/monochrome switch 304.

The color/monochrome switch 304 switches the image data output in accordance with instructions from the CPU 201. When color image data output is specified, R, G, and B color image data are output, whereas only G image data are output when monochrome image data output is specified. The G image data are output as monochrome image data because the G image data are nearest the sensitivity characteristics of the human eye.

The image data output from the color/monochrome switch 304 are stored in RAM 203 via the output interface 308. The image data stored in the RAM 203 are suitably read out and output from the SCSI-I/F 204 to an external computer or the like in accordance with instructions from the CPU 201.

After gradient conversion, the R, G, and B image data are input to the color pixel discriminator unit 305. The color pixel discriminator unit 305 discriminates each pixel as a color pixel or a monochrome pixel. Specifically, the color pixel discriminator unit 305 discriminates whether or not difference in the gradient value of each R, G, and B color comprising a single pixel is below a predetermined value. For example, when the R, G, and B image data are 8-bit data, the color pixel discriminator unit 305 performs the calculation (|Ri−Gi|>32), or (|Gi−Bi|>32), or (|Bi−Ri|>32), and discriminates a pixel as a color pixel when the calculation result is true. In the above equations, Ri, Gi, and Bi are gradient values of the image data of each color R, G, and B. The previously mentioned predetermined value may be a variable value changeable by the CPU 201.

The discrimination result of each pixel is input to the color pixel counter 306. The color pixel counter 306 counts the number of color pixels based on the discrimination result.

The color pixel count value is input to the color document determination unit 307, and the color document determination unit 307 compares the color pixel count value to a predetermined threshold value, then either determines the document is a color document when the count value meets or exceeds the threshold value, or determines the document is a monochrome document when the count value is less than the threshold value. The threshold value may be a variable value changeable by instruction from the CPU 201. The determination result of either a color document or a monochrome document is input to the CPU 201 via the output interface 308.

The drive controller 208 controls the motor M1 for moving the reading unit 111, the motor M2 for the transport belt 107 within the ADF 101, and the pick-up motor M3 in accordance with instructions from the CPU 201.

The operation of the reading device 100 is described below with reference to the flow charts of FIGS. 4, 5, and 6.

Figure 4:
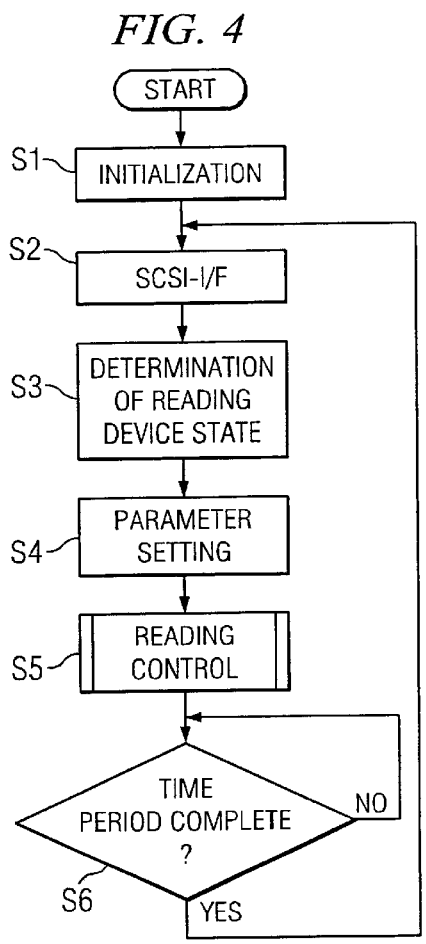
FIG. 4 is a main flow chart showing the control sequence of the reading device.

FIG. 4 is a main flow chart showing the control sequence for the operation of the reading device 100.

First, the CPU 201 reads the programs stored within the ROM 202 to RAM 203, and sets the various types of necessary initial settings simultaneously with the start of the processing (S1). Then, the SCSI-I/F 204 is controlled to receive setting information from a connected computer or the like, or outputs image data to the computer if output data are present (S2). Next, the state of the reading device is determined from the signals of the various sensors within the reading device 100 (S3). The state of the reading device 100 includes, for example, whether or not a document has been set, or whether or not a document has reached the standard position determined from the ON/OFF signal of the standard position sensor 106. Then, parameters such as reading resolution and reading area are set based on the setting information input from the computer (S4). Thereafter, the document is moved by reading control, and read based on the set parameters (S5). Reading control is described later. Next, a set time period is measured by a loop counter, and after the count ends, the routine returns to step S2, and the subsequent steps S2–S6 are repeated.

Figure 5:
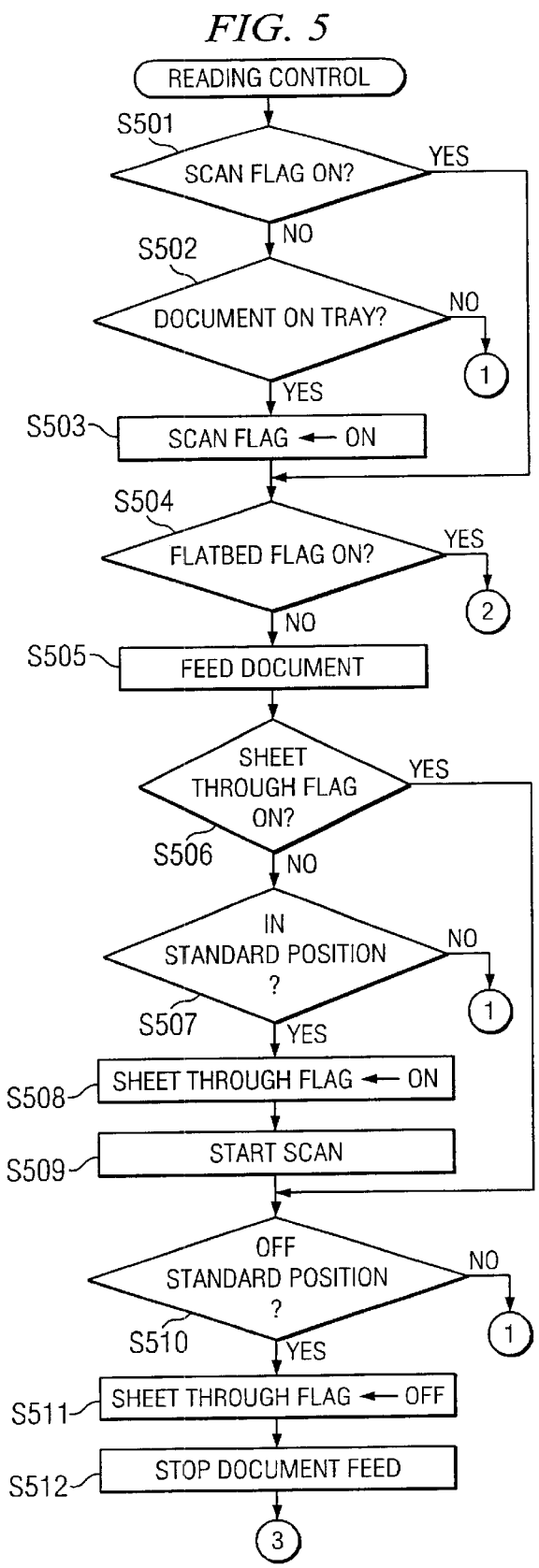
FIG. 5 is a subroutine flow chart showing the sequence of the reading control.
Figure 6:
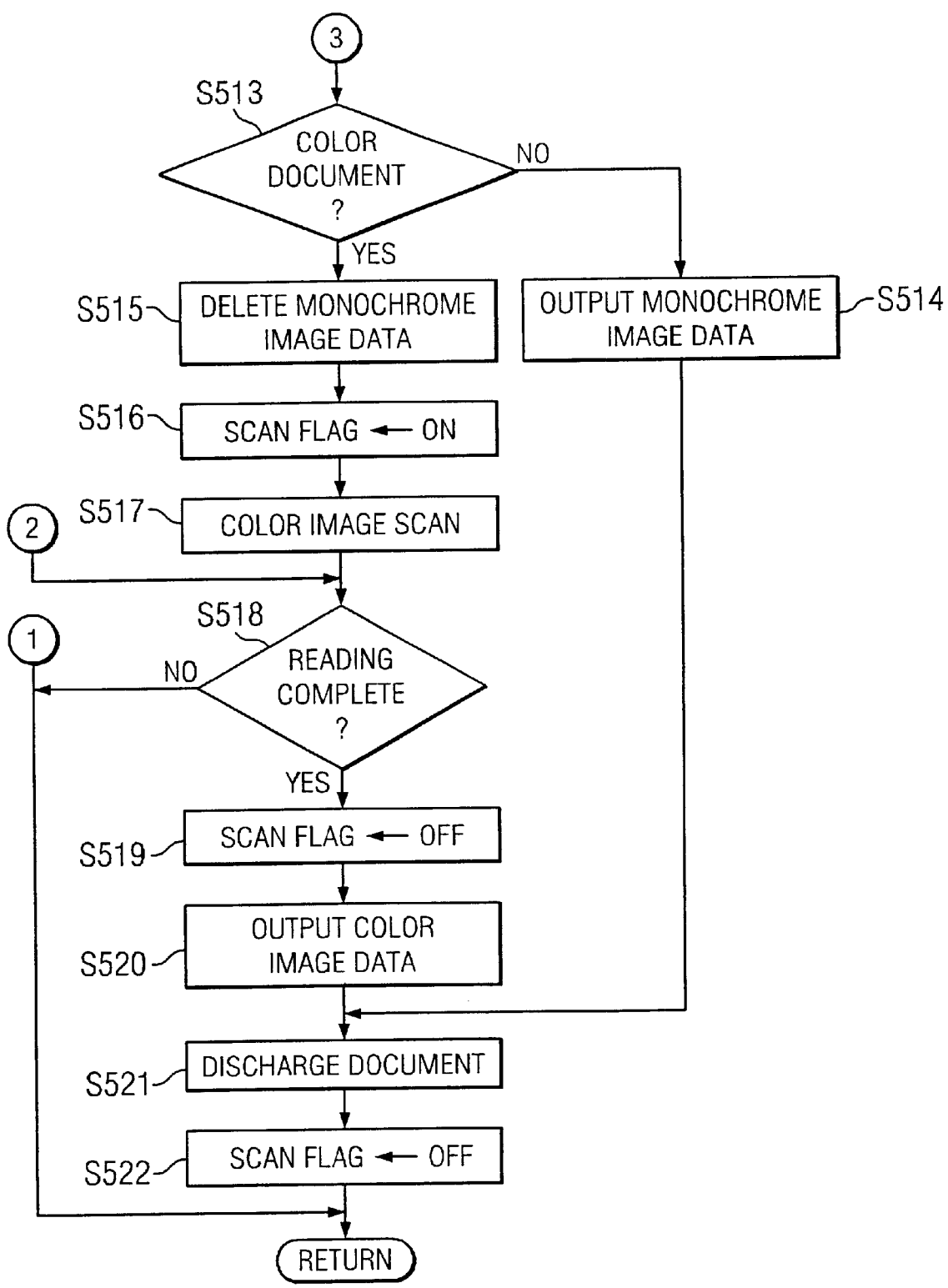
FIG. 6 is a flow chart continuing FIG. 5.

FIGS. 5 and 6 are subroutine flow charts of the reading control.

In reading control, first, a determination is made as to whether or not the on-going scan flag is set, i.e., whether or not a document is currently being read (S501). If a document is not currently being read (S501: NO), then a determination is made as to whether or not a document is placed on the document tray 103 (S502). If a document is placed in the document tray (S502: YES), the on-going scan flag is set to indicate a document is currently being read (S503). If a document is not set in the document tray (S502: NO), the subroutine returns to the main routine.

On the other hand, if a document is currently being read (S501: YES), a determination is made as to whether or not the on-going flatbed scan flag is set (S504). If the on-going flatbed scan flag is not set (S504: NO), feeding of a document from the document tray 103 starts because there is no document present on the platen 110 (S505). If the on-going flatbed scan flag is set (S504: YES), the routine advances to step S518, and a determination is made as to whether or not reading via the flatbed scan method has ended.

When the document transport begins, a determination is made as to whether or not the on-going sheet-through scan flag is set (S506). If the on-going sheet-through scan flag is set (S506: YES), the routine advances to step S510, and a determination is made as to whether or not reading via the sheet-through scan method has ended.

If the on-going sheet-through scan flag is not set (S506: NO), a determination is made as to whether or not the leading edge of the document has been transported to the standard position sensor 106 in accordance with whether or not an ON-edge signal, (i.e., a signal changing the sensor from OFF to ON) is detected from the standard position sensor 106 (S507). If the leading edge of the document has been transported to the standard position sensor 106 (S507: YES), the on-going sheet-through scan flag is set (S508), and reading via the sheet-through scan method starts together with monochrome image instructions (S509). On the other hand, if the leading edge of the document has not reached the standard position (S507: NO), the subroutine returns to the main routine.

The color/monochrome switch output is switched to monochrome via the monochrome image instruction, and the read image data are stored in RAM 203 as monochrome image data. A determination is then made as to whether or not the document read by the sheet-through scan method is a color document via the color document determination unit 307.

Then a determination is made as to whether or not the reading of the document has ended based on the detection of an OFF-edge signal (i.e., a signal changing the sensor from ON to OFF) from the standard position sensor 106 (S510), and if reading has ended (S510: YES), the on-going sheet-through-scan flag is reset (S511). On the other hand, if document reading has not ended (S510: NO), the subroutine returns to the main routine.

When reading of the entire surface of a single document sheet via the sheet-through scan method ends, and after a predetermined time has elapsed from the detection of the OFF-edge signal from the standard position sensor 106, the document transport is stopped (S512), and the document is set stationary at a predetermined position on the platen 110.

Then a determination is made as to whether or not the read document is a color document from the determination result of the color document determination unit 307 (S513). If the read document is not a color document (S513: NO), instructions for outputting the monochrome image data stored in RAM 203 are set (S514), and the document is discharged (S521). Thereafter, the on-going scan flag is reset (S522).

The monochrome image data set for output are output from the SCSI-I/F 204 by the process of the previously mentioned step S2 after the subroutine returns to the main routine.

On the other hand, when a color document is determined in step S513 (S513: YES), the monochrome image data stored in the RAM 203 are annulled (S515), and the on-going flatbed scan flag is set (S516). Then, the reading is started via the flatbed scan method together with the color image instruction (S517).

The output of the color/monochrome switch 304 is switched to color via the color image instruction, and the read image data are stored in RAM 203 as color image data.

Next, a determination is made as to whether or not reading via the flatbed scan method has ended (S518). If reading has not ended (S518: NO), the subroutine returns to the main routine.

If reading has ended S518: YES), the ongoing flatbed scan flag is reset (S519), the color image data output instruction is set (S520), and the document is discharged (S521). Thereafter, the on-going scan flag is reset (S522).

The color image data set for output are output from the SCSI-I/F 204 by the process of previously mentioned routine returns to the main routine.

The reading operation of the reading device 100 is described below by way of examples.

Figure 7:
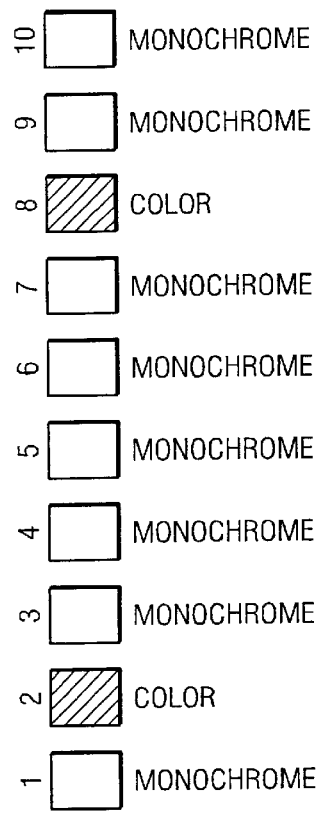
FIG. 7 shows an example of a document.

The document to be read comprises 10 sheets, including a mix of 8 sheets of monochrome documents and 2 sheets of color documents, as shown in FIG. 7.

Figure 8:
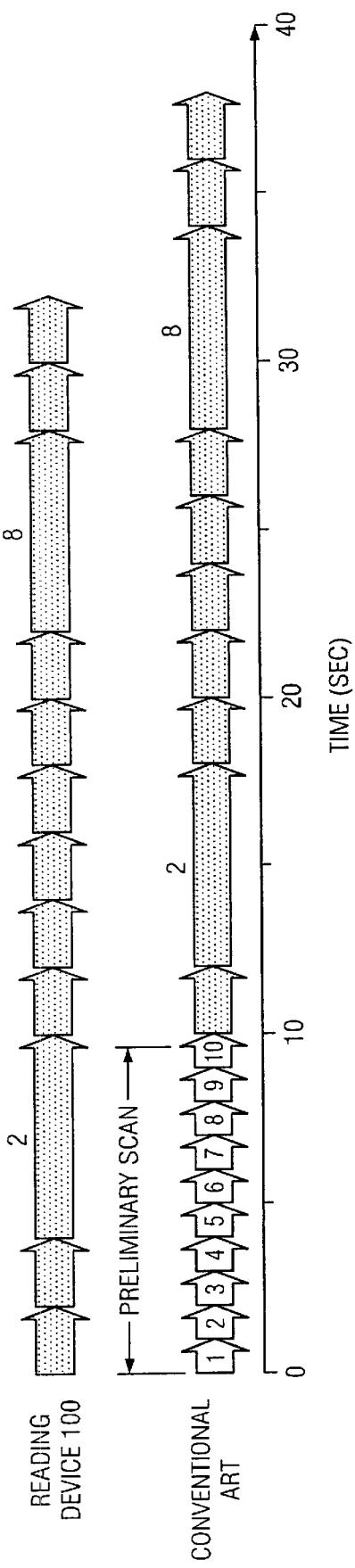
FIG. 8 compares the reading time of the present invention and the reading time of the conventional art.

FIG. 8 shows the time required when consecutively reading the 10 sheets shown in FIG. 7 by the reading device 100, and shows the time required by the conventional art for reading after determining the color documents and monochrome documents via a preliminary scan. As can be understood from FIG. 8, reading by the reading device 100 of the present invention requires less total reading time compared to the conventional art by omitting the preliminary scan.

In the reading device 100, the reading speed is stable and color shift does not occur because color documents are read by the flatbed scan method.

In the previously described control sequence, color image data are temporarily stored in RAM 203 so as to be output therefrom when a color document is read by the flatbed scan method, and may be output directly without being stored in RAM 203 after various image correction such as shading correction and gradient conversion. In this instance, the image data storage area in the RAM 203 may use a capacity for storing one document sheet of monochrome image data.

Although the present invention has been described by way of an embodiment applying the invention to a simple reading device, the invention is not limited to this arrangement.

Another embodiment pertains to control from a computer when the reading device is connected, for example, to a personal computer or the like. When the reading device is controlled from a personal computer, the documents may be fed and read consecutively by the sheet-through scan method and flatbed scan method in the same way as the previously described reading device 100. Then, all the image data read by the sheet-through scan method may be output without storing in the reading device. The image data output from the reading device are all R, G, and B image data. In this case, the reading device need not have a memory for storing the image data. On the other hand, the personal computer can determine whether a document is a color document or monochrome document from the R, G, and B image data obtained by reading via the sheet-through scan method, and store only the G image data among the R, G, and B image data as monochrome image data. The personal computer saves the stored monochrome image data when the determination result is a monochrome document, or annuls the stored monochrome image data when the determination result is a color document, and instructs the reading device to read the document using the flatbed scan method. Then, the reading device reads the document using the flatbed scan method based on the aforesaid instruction, and outputs the R, G, and B color data again to the personal computer. Accordingly, when a plurality of documents comprising a mixture of color documents and monochrome documents are consecutively read, the total reading time is reduced in the same way as when reading a document by a simple reading device. When the reading device is controlled by a computer and reads a document, the present invention can be realized by storing programs generated based on the aforesaid control sequence on a computer-readable storage medium.

Another embodiment of the image reading device applies the present invention to, for example, a color digital copier provided with an ADF 101. In this case, a reading device identical to the previously described embodiment may be provided as the reading unit in a copier. Furthermore, the reading device 100 of the previously described embodiment may be directly connected to a printer so as to print the image data output from the reading device 100 and used as an image forming apparatus.

Although the present invention has been fully described by way of example with reference to the accompanying drawings, it is to be understood that various changes and modifications will be apparent to those skilled in the art. Therefore, unless such changes and modifications otherwise depart from the scope of the present invention, they should be construed as being included herein.

What is claimed is:

1. An image reading device comprising:
    a reading unit for reading a document to generate image data, the reading unit being movable relative to the document;
    a reading method controller for setting a reading method of a reading unit at one of a first reading method and a second reading method, the first reading method reading the document by moving the document while the reader unit is stationary, the second reading method reading the document by moving the reader unit while the document is stationary, the reading method controller initially setting the first reading method so that the reading unit reads the document a first time by the first reading method to generate first image data;
    a decision unit for determining whether said first image data correspond to one of a color document and a monochrome document, and in the case where said first image data are determined to correspond to a color document the decision unit instructing the reading method controller to set the second reading method and instructing the reading unit to read the document a second time to generate second image data by the second reading method; and
    an output controller for outputting said first image data when the decision unit determines that said first image data correspond to a monochrome document, and for outputting said second image data when the decision unit determines that said first image data correspond to a color document.

2. An image reading device in accordance with claim 1, wherein the reading unit includes an image sensor for sensing a red image, a green image, and a blue image, the image sensor comprising a plurality of pixels.

3. An image reading device in accordance with claim 2, wherein the decision unit includes:
    a color pixel discrimination unit for determining whether pixel data correspond to color pixel data or monochrome pixel data, the color pixel discrimination unit determining that pixel data correspond to color pixel data when a condition $|Ri-Gi|>K$ is true and determining that pixel data correspond to monochrome pixel data when the condition is false, Ri being a gradient value of red datum for a pixel i, Gi being a gradient value of green datum for a pixel i, and K being a first threshold; and
    a color pixel counter for counting a quantity of pixel data which satisfy the condition,
    wherein the decision unit determines that said first image data correspond to a color document when the thus counted quantity of pixel data which satisfy the condition is greater than a second threshold and determining that said first image data correspond to a monochrome document when the quantity of pixel data counted in the counting step is not greater than the second predetermined threshold.

4. An image reading device in accordance with claim 2, wherein the output controller outputs said green image data when the decision unit determines that said first image data correspond to a monochrome document, and outputs said red, green, and blue image data when the decision unit determines that said first image data correspond to a color document.

5. An image reading device in accordance with claim 1, further comprising an image forming system for printing thus outputted image data on print media.

6. An image reading method comprising the steps of:
reading a document by a first reading method in which the document is moved while a reader unit is stationary, the reader unit thereby generating first image data;
determining whether the first image data correspond to one of a color image and a monochrome image;
outputting said first image data when the step of determining determines that said first image data correspond to a monochrome document;
reading the document by a second reading method in which the reader unit is moved while the document is stationary when the step of determining determines that said first image data correspond to a color document, the reader unit thereby generating second image data by the second reading method; and
outputting said second image data when the step of determining determines that said first image data correspond to a color document.

7. An image reading method in accordance with claim 6, wherein each step of reading the document generates a red image, a green image, and a blue image, each of said red, green, and blue images comprising a plurality of corresponding pixel datum.

8. An image reading method in accordance with claim 7, wherein the step of determining includes:
determining that pixel data correspond to color pixel data when a condition |Ri−Gi|>K is true and determining that pixel data correspond to monochrome pixel data when the condition is false, Ri being a gradient value of red datum for a pixel i, Gi being a gradient value of green datum for a pixel i, and K being a first threshold;
counting a quantity of pixel data which satisfy the condition; and
determining that said first image data correspond to a color document when the quantity of pixel data counted in the counting step is greater than a second predetermined threshold and determining that said first image data correspond to a monochrome document when the quantity of pixel data counted in the counting step is not greater than the second predetermined threshold.

9. An image reading method in accordance with claim 7, wherein the step of outputting image data outputs said green image data when the step of determining determines said first image data correspond to a monochrome document, and outputs said red, green, and blue image data when the step of determining determines said first image data correspond to a color document.

10. An image reading method in accordance with claim 6, further comprising the step of printing thus outputted image data on print media.

11. A computer program product for use in an image reading system having a recording medium, the product comprising instructions, executable by the image reading system and recorded on the recording medium, for:
reading a document by a first reading method in which the document is moved while a reader unit is stationary, the reader unit thereby generating first image data;
determining whether said first image data correspond to one of a color image and a monochrome image;
outputting said first image data when the instructions for determining determine that said first image data correspond to a monochrome document;
reading the document by a second reading method in which the reader unit is moved while the document is stationary when the instructions for determining determine that said first image data correspond to a color document, the reader unit thereby generating second image data by the second reading method; and
outputting said second image data when the instructions for determining determine that said first image data correspond to a color document.

12. A computer program product in accordance with claim 11, wherein the instructions for reading the document generate a red image, a green image, and a blue image, each of said red, green, and blue images comprising a plurality of corresponding pixel datum.

13. A computer program product in accordance with claim 12, wherein the instructions for determining include instructions for:
determining that pixel data correspond to color pixel datum when a condition |Ri−Gi|>K is true and determining that pixel data correspond to monochrome pixel data when the condition is false, Ri being a gradient value of red datum for a pixel i, Gi being a gradient value of green datum for a pixel i, and K being a first threshold;
counting a quantity of pixel data which satisfy the condition; and
determining that said first image data correspond to a color document when the quantity of pixel data counted in the counting instructions is greater than a second predetermined threshold and determining that said first image data correspond to a monochrome document when the quantity of pixel data counted in the counting instructions is not greater than the second predetermined threshold.

14. A computer program product in accordance with claim 12, wherein the instructions for outputting image data output said green image data when the instructions for determining determines said first image data correspond to a monochrome document, and output said red, green, and blue image data when the instructions for determining determines said first image data correspond to a color document.

15. A computer program product in accordance with claim 11, further comprising instructions for printing thus outputted image data on print media.

* * * * *